United States Patent Office 3,506,679
Patented Apr. 14, 1970

3,506,679
2,5- AND 4,5-DIARYLTHIAZOLYL LOWER FATTY ACIDS AND DERIVATIVES THEREOF
John F. Cavalla, Isleworth, and Kevan Brown, Woodley, England, assignors, by mesne assignments, to John Wyeth & Brother Limited, Taplow, Maidenhead, England, a British company
No Drawing. Filed May 27, 1968, Ser. No. 732,070
Claims priority, application Great Britain, June 7, 1967, 26,262/67
Int. Cl. C07d 91/32
U.S. Cl. 260—302                              6 Claims

ABSTRACT OF THE DISCLOSURE

A group of diaryl thiazoles substituted at the 2- or 4-positions with an aliphatic acid radical (e.g., acetic or propionic) is described. The compounds are useful as antiinflammatory agents.

---

This invention relates to novel heterocyclic aromatic compounds, to processes for the preparation thereof and to pharmaceutical compositions containing such compounds.

A well-known drug having antiinflammatory activity is phenylbutazone, though this has disadvantages, e.g., ulcerogenic activity. Another drug used to treat inflammation is aspirin though high doses are required and furthermore it is very ulcerogenic.

In our search for compounds possessing antiinflammatory activity, we have discovered some new groups of trisubstituted aromatic thiazole compounds (see our copending U.S. application Ser. No. 679,999, filed Nov. 2, 1967).

The present invention provides as a further group, novel compounds of the general formula:

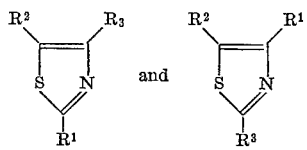

and acid addition salts thereof, in which $R^1$ and $R^2$ are the same or different and are substituted or unsubstituted aryl groups (which may be heteroaryl groups) and $R^3$ is a straight chain or branched aliphatic acid radical containing 2 to 6, preferably 2 to 4 carbon atoms in the chain, or a derivative thereof. The radicals $R^1$ and $R^2$ may be monocyclic or bicyclic aromatic carbocyclic radicals (such as phenyl or naphthyl radicals) or may be heterocyclic aryl radicals (such as thienyl or furyl radicals) any of which radicals may be substituted but for simplicity $R^1$ and $R^2$ are referred to herein as aryl radicals.

The compounds of the above general formula exhibit anti-inflammatory activity generally with little or substantially no ulcerogenic activity, as shown by tests on laboratory animals, and are intermediates in the preparation of other substituted thiazoles. The compounds of this invention are accordingly of value in experimental pharmacology for study of the inflammatory response and in mammalian therapy for the prevention, control, and relief of inflammation. Examples of tests which can indicate that a compound has antiinflammatory activity are those described by Winter et al. in Proc. Soc. Biol. Med. 111, 544 (1962), Buttle et al. in Nature 179, 629 (1957), Konzett and Rossler in Arch. Path. Pharmac. 195, 71 (1940) and Newbould in Brit. Jour. Pharm. Chemoth. 21, 127–137 (1963).

Examples of radicals $R^1$ and $R^2$ are unsubstituted phenyl, or phenyl substituted by halogen (e.g., fluorine, chlorine or bromine), by lower alkyl (e.g., methyl, ethyl, propyl, isopropyl, n-butyl or isobutyl), by lower alkoxy (e.g., methoxy, ethoxy, propoxy or butoxy), by nitro, by amino, particularly by substituted amino such as dialkylamino (for example, dimethylamino), by halo-lower-alkyl (e.g., trifluoromethyl), by mercapto, by alkylthio (e.g., methylthio), by alkylsulphonyl (e.g., methyl sulphonyl), by methoxy and halogen or by methyl and halogen radicals (though in general usually only one substituent at the most is present in each phenyl ring), 1- and 2-naphthyl, 2- and 3-furyl, 2- or 3-thienyl and 2-, 3- and 4-pyridyl. The term "lower" as used herein means that the radical contains 1 to 6, preferably 1 to 4 carbon atoms.

The compounds of the above general Formula I can be prepared by methods known in the art for the synthesis of such thiazole rings.

$R^3$ may be an acid (for example, acetic, n-propionic, iso-propionic, n-butyric, iso-butyric or an ethylenically unsaturated acid such as acrylic acid) or a salt, ester, amide, thioamide or hydroxamic acid derivative thereof.

As the compounds of general Formula I contain a basic nitrogen atom, they can form salts with pharmaceutically acceptable acids, (though they are easily hydrolysed back to the free base), and the invention also provides such salts.

The compounds of this invention may be administered in admixture with a pharmaceutically acceptable carrier, which may be a solid, a liquid or a mixture of a solid and a liquid. The compounds may be administered orally or parenterally.

The following nonlimiting examples illustrate the invention.

EXAMPLE 1

2,5-diphenylthiazol-4-ylacetic acid

Ethyl 4-phenylacetoacetate (5.15 g.) was brominated (4 g.) in anhydrous ether. After leaving for 18 hours at room temperature, water was added cautiously. The ether layer was washed, dried and evaporated to give ethyl 4-bromo-4-phenyl-acetoacetate. Yield 7.14 g.

This ester (7.14 g.) in acetone (20 ml.) was treated with a solution of thiobenzamide (3.4 g.) in acetone (30 ml.) at room temperature, and then boiled under reflux for 2 hours. After evaporating to dryness, water and ether were added, the ether extract was washed with sodium bicarbonate solution and water, dried ($MgSO_4$) and evaporated to give 2,5-diphenylthiazol-4-ylacetic acid ethyl ester. Yield 8.07 g. (Approx. 100%).

This ester (8.07 g.) in ethanol (50 ml.) was treated with aqueous potassium hydroxide solution (2 g. in 10 ml). After warming on a steam bath for 15 minutes, the solution was left at room temperature for 1 hour. The solution was evaporated to dryness and ether and water added. After purifying with charcoal, filtering and acidifying, the crude acid (3.2 g.) was filtered off and recrystallized from benzene. Yield 2.5 g. (33.5%), M.P. 171° C.

*Analysis.*—Found (percent): C, 69.0; H, 4.4; N, 4.8; S, 11.0. $C_{17}H_{13}NO_2S$ requires (percent): C, 69.2; H, 4.4; N, 4.7; S, 10.9.

In the rat paw oedema test, when administered orally at a level of 100 mg./kg., this compound showed 40% inhibition of carrageenin-induced swelling.

EXAMPLE 2

β-(4,5-diphenylthiazol-2-yl)propionic acid

α-Bromodeoxybenzoin (68.8 g.) and benzoyloxythioacetamide (68.3 g.) were reacted together following the general method given in JACS 53, 1470 (1931) for 2-benzoyloxymethyl-4-phenylthiazole to give 2-benzoyloxymethyl-4,5-diphenylthiazole. Yield 58.5 g., M.P. 157–160° C.

This benzoate (58.5 g.) was warmed on a steam bath for 30 minutes with potassium hydroxide (10 g.) in ethanol and then poured into ice water. The oily solid was extracted with ether and the ethereal solution evaporated to give 2-hydroxymethyl-4,5-diphenylthiazole. Yield 41.6 g., (98.5%), M.P. 113–17° C. This compound (12.9 g.) was then treated with phosphorus oxychloride (20 ml.) to give 2-chloromethyl-4,5-diphenylthiazole. Yield 13.7 g. (88.4%), M.P. 76–78° C.

A warm solution of the chloromethyl compound (12.0 g.) in absolute ethanol (100 ml.) was added to a refluxing ethanolic solution of sodio dimethylmalonate (from 1.55 g. of sodium and 10.7 g. of diethylmalonate). After refluxing for 2 hours, crude diethyl 4,5-diphenylthiazol-2-ylmalonate (18 g.) was obtained. This was then hydrolyzed with potassium hydroxide (20 g.) in water (20 ml.) to give the acid as a yellow foam. The title compound was obtained therefrom by heating under reflux for 1 hour in dry dimethyl formamide (25 ml.), M.P. 52–58° C.

*Analysis.*—Found (percent): C, 69.6; H, 4.8; N, 4.7. $C_{18}H_{15}NO_2S$ requires (percent): C, 69.9; H, 4.9; N, 4.5.

In the rat paw oedema test, when administered orally at a level of 100 mg./kg., this compound showed 33% inhibition of carrageenin-induced swelling.

EXAMPLE 3

Ethyl 5-(p-chlorophenyl)-2-phenylthiazol-4-ylacetate

A solution of ethyl 4-(p-chlorophenyl)acetoacetate (7.38 g.) in ether (50 ml.) was treated dropwise with bromine (1.6 ml.) and the resulting solution left at room temperature for 16 hours. Washing the solution with water, drying ($MgSO_4$) and evaporating under reduced pressure gave 9.6 g. (100%) of ethyl 4-bromo-4-(p-chlorophenyl)acetoacetate as a yellow colored oil, which was used for the next stage without further purification.

A mixture of ethyl 4-bromo-4-(p-chlorophenyl)acetoacetate (9.6 g.), thiobenzamide (4.1 g.) and sodium carbonate (1.6 g.) in ethanol (35 ml.) was heated under reflux for 3 hours. Evaporation to dryness in vacuo gave a semi-solid residue which was taken up in ethyl acetate, washed with water, dried ($MgSO_4$) and evaporated under reduced pressure to give 10.7 g. (100%) of the title compound as a pale-yellow colored solid. A sample (5.0 g.) was recrystallized from ethanol to give the pure ester, M.P. 108–109° C.

*Analysis.*—Found (percent): C, 64.1; H, 4.5; N, 3.8. $C_{19}H_{16}ClNO_2S$ requires (percent): C, 63.75; H, 4.5; N, 3.9.

EXAMPLE 4

5-(p-chlorophenyl)-2-phenylthiazol-4-ylacetic acid

A solution of ethyl 5-(p-chlorophenyl)-2-phenylthiazol-4-ylacetate (5.0 g.) in hot ethanol (30 ml.) was treated with a solution of potassium hydroxide (5.0 g.) in water (5 ml.) and set aside at room temperature for 16 hours. Dilution with water (50 ml.) and acidification with concentrated hydrochloric acid gave a pale-yellow colored precipitate which was filtered off, washed with water and dried. Recrystallization from benzene afforded 2.3 g. (50%) of the required acid, M.P. 202.5–204.5° C.

*Analysis.*—Found (percent): C, 62.1; H, 3.6; N, 4.3. $C_{17}H_{12}ClNO_2S$ requires (percent): C, 61.9; H, 3.7; N, 4.25.

EXAMPLE 5

2-(p-chlorophenyl)-5-phenylthiazol-4-ylacetic acid

Ethyl 4-bromo-4-phenylacetoacetate (10.0 g.) and p-chlorothiobenzamide (6.0 g.) were dissolved in ethanol (100 ml.) and boiled under reflux for 3 hours. Sodium hydroxide (8.0 g.) in ethanol (15 ml.) was added to the cooled reaction mixture which was then warmed on a steam bath for 5 minutes. The red solution was evaporated to dryness and water was added. The aqueous solution was washed with ether, clarified with charcoal and then acidified with concentrated hydrochloric acid to give a white precipitate. The precipitate was filtered, dried, and recrystallized from benzene to give white crystals of 2-(p-chlorophenyl)-5-phenylthiazol-4-ylacetic acid (5.3 g., 45.0%), M.P. 200–1° C.

*Analysis.*—Found (percent): C, 61.8; H, 3.6; N, 4.3. $C_{17}H_{12}ClNO_2S$ requires (percent): C, 61.9; H, 3.7; N, 4.25.

What is claimed is:

1. A diaryl thiazole having the formula:

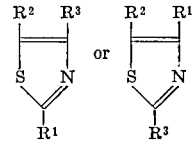

in which $R^1$ and $R^2$ are each members of the group consisting of phenyl and chlorophenyl, and $R^3$ is a radical of the group consisting of $-CH_2-CO_2H$, $-CH_2-CH_2-CO_2H$, and $-CH_2-CO_2C_2H_5$.

2. A compound according to claim 1 which is 2,5-diphenylthiazol-4-ylacetic acid.

3. A compound according to claim 1 which is β-(4,5-diphenylthiazol-2-yl)propionic acid.

4. A compound according to claim 1 which is ethyl 5-(p-chlorophenyl)-2-phenylthiazol-4-ylacetate.

5. A compound according to claim 1 which is 5-(p-chlorophenyl)-2-phenylthiazol-4-ylacetic acid.

6. A compound according to claim 1 which is 2-(p-chlorophenyl)-5-phenylthiazol-4-ylacetic acid.

References Cited

UNITED STATES PATENTS 2,020,650   11/1935   Johnson _____ 260—302

FOREIGN PATENTS 1,509,969   12/1967   France.

ALEX MAZEL, Primary Examiner

R. J. GALLAGHER, Assistant Examiner

U.S. Cl. X.R.

424—270